United States Patent [19]

Mitchell

[11] 3,837,180
[45] Sept. 24, 1974

[54] ANGULAR COUPLING

[76] Inventor: Roger H. Mitchell, 5809 36th Ave., Kenosha, Wis. 53140

[22] Filed: July 20, 1972

[21] Appl. No.: 273,433

[52] U.S. Cl............................ 64/17 R, 64/6, 64/16, 64/17 SP
[51] Int. Cl............................................. F16d 3/26
[58] Field of Search....... 64/16, 2 P, 17 SP, 6, 17 R, 64/17 A

[56] References Cited
UNITED STATES PATENTS

| 1,111,640 | 9/1914 | Brewster | 64/17 SP |
|---|---|---|---|
| 1,525,026 | 2/1925 | Dickerman | 64/6 |
| 3,073,630 | 1/1963 | Kuhn, Jr. | 64/17 A |

Primary Examiner—Samuel Scott
Assistant Examiner—Randall Heald
Attorney, Agent, or Firm—Paul H. Gallagher

[57] ABSTRACT

An angular coupling made up of three main parts — a pair of end pieces having loops interlocked in mutually transverse positions, and a double reverse-turn continuous center piece forming linear elements respectively positioned in the concave corners formed by the interlocked loops, whereby the loops and linear pieces together form a circumferentially continuous series of interengaging elements through which the torque is transmitted.

11 Claims, 10 Drawing Figures

PATENTED SEP 24 1974  3,837,180

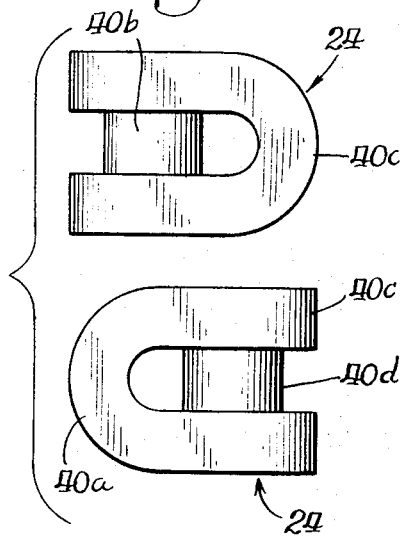
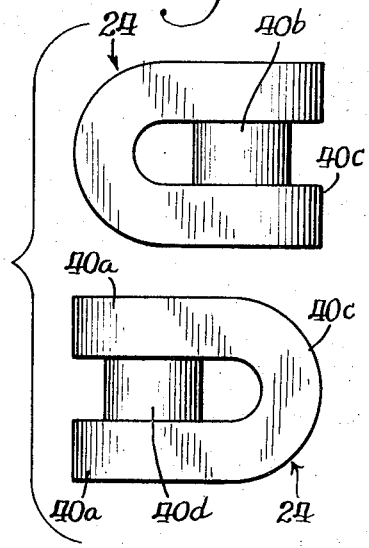
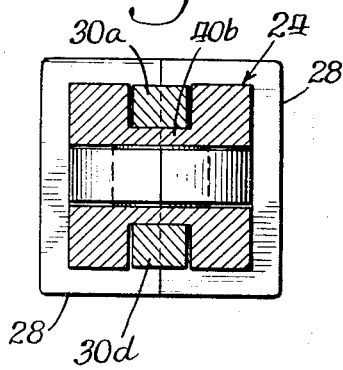
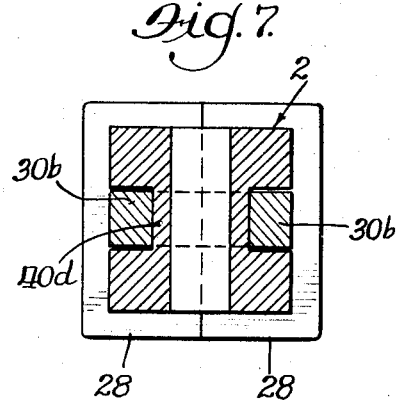
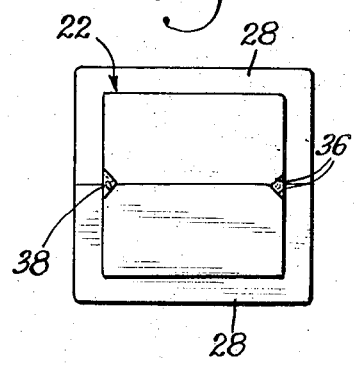
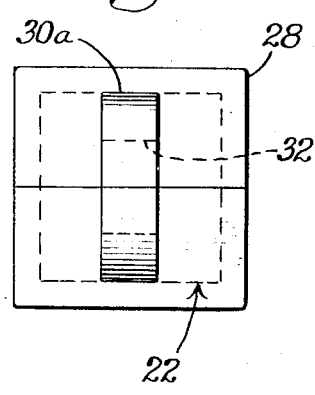
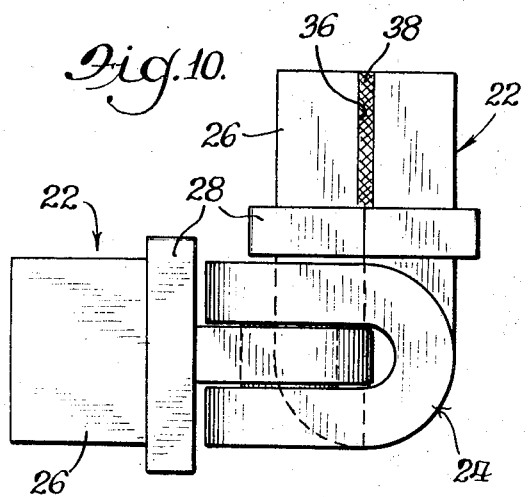

ANGULAR COUPLING

1. Field of the Invention

The invention resides in the field of connectors providing universal transmission of rotation, i.e., for transmitting rotational drive at an angle to a straight line. Such a device is known as an angular coupling, and also as a universal joint or coupling.

2. Objects of the Invention

A broad object of the invention is to provide an angular coupling of unusual strength, and thereby of small size for any given capacity or load requirements.

Another broad object is to provide an angular coupling of the foregoing character in which there substantially no shear forces.

Still another object is to provide an angular coupling of the foregoing character of novel construction which includes a pair of end pieces having loops that are interlocked in mutually transverse positions, and a center piece having linear elements effectively interposed between the elements of the loops in circumferential direction around the coupling whereby the torque is transmitted in circumferential elements, substantially without shear forces.

Still another object is to provide an angular coupling of the foregoing character that is simple in construction, and containing a minimum number of parts.

Still another object is to provide an angular coupling of the foregoing general character which can be made in simple fabrication and assembly steps.

A still further object is to provide an angular coupling in which the parts can be turned to full 90° relative position, and it can thereby be used as a wrench in a manual operation.

A still further object is to provide a novel method for manufacturing an angular coupling of the foregoing general character.

DESCRIPTION OF A PREFERRED EMBODIMENT

In the drawings:

FIG. 4 is a detail illustration of the center piece, in transverse views;

FIG. 5 is a view similar to that of FIG. 4, but at a 90° angle relative thereto;

FIG. 6 is a sectional view taken at line 6—6 of FIG. 2;

FIG. 7 is a sectional view taken at line 7—7 of FIG. 2;

FIG. 8 is an end view of an end piece taken at line 8—8 of FIG. 3;

FIG. 9 is an end view of the inner end of an end piece taken at line 9—9 of FIG. 3; and FIG. 10 is a plan view of the angular coupling with the parts turned to a full 90° position.

Figure 1:
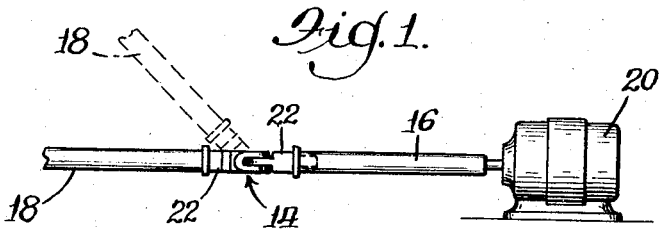
FIG. 1 is a small scale view of a drive component embodying the angular coupling of the invention.

FIG. 1 shows the use of the angular coupling 14 in a representative drive transmitting arrangement. The coupling itself is interposed between a drive section 16 and a driven section 18 of the shaft, the drive being derived from a suitable source such as a motor 20. The driven section 18 of the shaft as indicated may assume various angle positions relative to the drive section.

Figure 2:
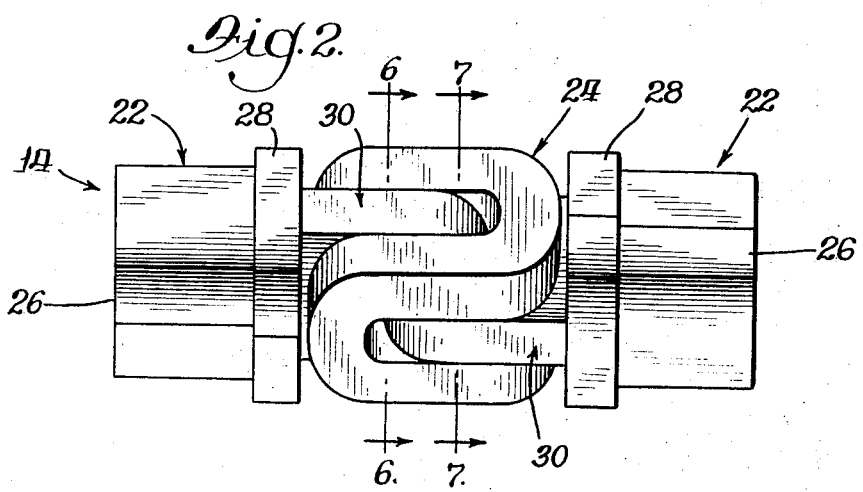
FIG. 2 is a larger scale perspective view of the angular coupling itself.
Figure 3:
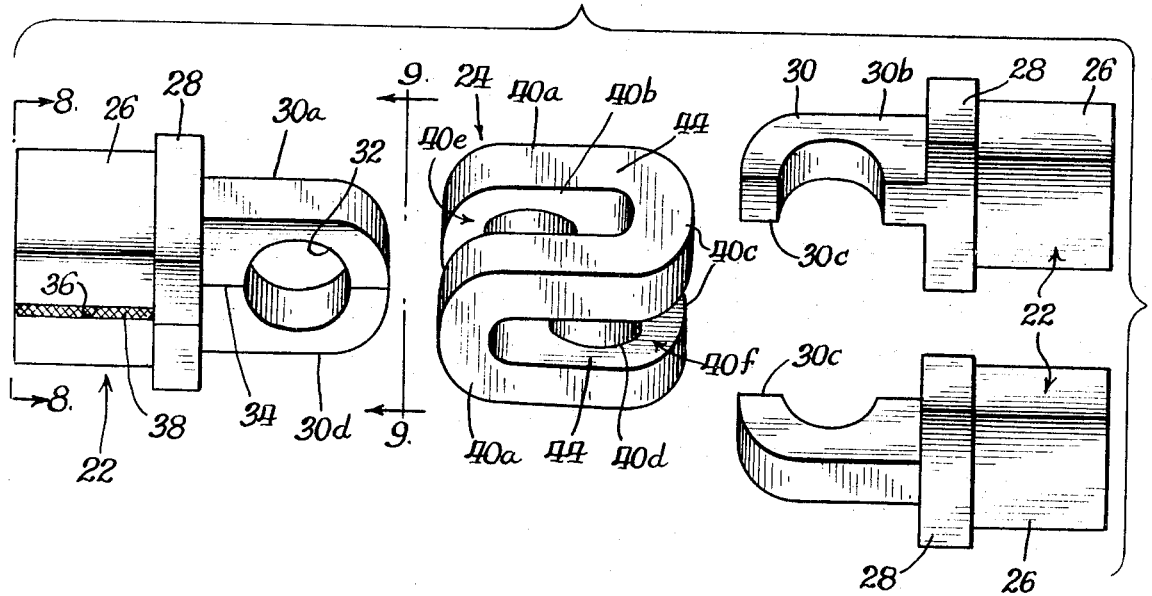
FIG. 3 is a perspective view in exploded form showing the coupling with the parts separated from one another.

The angular coupling 14, as shown best in FIGS. 2-5, includes a pair of end pieces 22 identical in construction but arranged in mutual transverse positions in the coupling, and a center piece 24. FIG. 3 shows the three main parts of the angular coupling in separated positions, and one of the end pieces itself separated into two halves. The end pieces are formed each in two halves, and in the assembly of the device the two halves are welded together to form an end piece that is unitary and effectively integral.

Each end piece in its final form includes a connecting section 26 that is polygonal, and preferably square, (and which can be splined), inserted in a complementally shaped socket in the section of the shaft 16, 18. At one end of this square section is a flange 28 which abuts against the end of the shaft, and extending from the flange 28 is a loop 30 of relatively flat form and having a circular aperture 32 therethrough. It is formed of a pair of complementary parts, on opposite sides of a plane 34 extending transverse to the flat loop 30, i.e., the plane containing the axis of the aperture 32.

The fact of forming the end pieces in parts or halves is significant in assembling the pieces of the coupling together, as to be referred to again hereinbelow, and in such assembly the two halves are welded together and for this purpose the parts of the end section 26 are formed with inclined surfaces 36 (see right hand end of FIG. 3 and FIG. 8). When the parts are fitted together these inclined surfaces 36 form a "V" shape on opposite sides and the troughs formed by these "V" shapes are filled with weld material 38 to weld two parts or halves together. The weld material 38 also appears in the left end piece of FIG. 3.

The center piece 24 is integral and in the form of a double reverse-turn continuous piece, such for example as a continuous band or belt in the form of a flattened loop, which is folded again about a transverse axis. This center piece as thus shaped includes a pair of spaced bend elements 40a at one end with a cylindrical element 40b therebetween, and bend elements 40c at the other end spaced apart with a cylindrical element 40d therebetween, these portions being respectively at mutually transverse positions, forming what might also be referred to as slots 40e and 40f.

The center piece 24 includes four linear elements 44 extending between the respective ones of the bend elements 40. The center piece is symmetrical about a longitudinal center axis therethrough and the linear elements 44 are therefore evenly spaced circumferentially around that axis. They are preferably square in cross section, or nearly square, whereby to provide maximum torque transmitting surfaces as referred to hereinbelow.

In FIG. 2 the end pieces are shown in their final condition and in FIG. 3 one of the end pieces is shown in parts and separated. Both pieces are made in mating parts, being connected in the assembly in mutually transverse positions, the hole 32 in each loop receiving the cylindrical element in the other end piece.

In assembling the parts together the parts of the end pieces are put into place and welded together by depositing weld material in the "V"s 36 (FIG. 8) as referred to above. These grooves may be of substantial dimensions, and the parts making up the section 26 are of substantial size so that the welding as referred to provides the necessary strength for holding the parts together, notwithstanding the immense forces that are encountered in the use of the device.

With the three main parts assembled as thus described, the linear elements 44 of the center piece are fitted into the concave angles between the outer elements of the loops; i.e., the side edge elements of the loops form radially extending ribs as shown best in FIGS. 6 and 7 and the linear elements 44 of the center piece are dimensioned so that, as viewed in cross section, they fill those concave angles out to the outer edges of the loops.

Thus, in transmitting rotation or torque from one shaft section to the other, each loop, for example 30b engages the corresponding two of the linear elements 44, and the latter linear elements then engage respective elements of the other loop 30a. All rotation or torque is thereby transmitted from one loop through the center piece to the other loop, substantially without any shear action. The loops interengage with the center piece throughout a substantial length in linear direction, this providing great mechanical strength due to the mass of those respective elements. There is virtually no interengagement between the loops themselves, in the rotational action.

The angular coupling contains great mass, not only in the loops and center piece, but also in the end pieces 22 whereby the coupling possesses unusual strength.

The coupling is made of steel, the pieces first being suitably fabricated in a process that may include forging and thereafter the assembled coupling is heat treated to provide great strength.

FIG. 10 shows the device in an extreme position i.e., the end sections can be turned to a full 90° relative angle. In such a situation the coupling may be used as a wrench in a manual operation.

The loops and the linear elements 44 are dimensioned for easy fitting together, i.e., there is no need for precision fitting, and there is firm contact engagement between respective ones of the linear elements between the driving loop and the respective ones of the linear elements to the driven loop, according to the direction of rotation.

I claim:

1. An angular coupling comprising,
a pair of end pieces each having a longitudinally extending loop, the loops being interlocked in mutually transverse positions,
the loops together in cross section forming in effect four radially extending ribs with concave corners between circumferentially adjacent ribs, the loops overlapping longitudinally a substantial extent,
and a center piece mounted on the interlocked loops, having four longitudinally extending linear elements disposed in said concave corners and effectively engaging respectively adjacent ones of the ribs of the loops and together with the latter forming a circumferentially continuous series of elements through which the torque is transmitted.

2. Angular coupling according to claim 1 wherein the center piece is in the form of a double reverse-turn member having bend elements which with the linear elements form a continuous and integral linear piece.

3. An angular coupling according to claim 2 in which the loops are in the form of flat members,
the center piece is provided with mutually transversely arranged slots receiving respective ones of the loops, and
the linear elements of the center piece extend longitudinally of the coupling at least in the interlocked portions of the loops.

4. An angular coupling according to claim 3 wherein the center piece extends substantially the full length of the loops in interconnected position.

5. An angular coupling according to claim 4 wherein the shape and dimensions of the loops and center piece are such as to enable the end pieces to be moved to a relative 90° position.

6. A method of forming an angular coupling which includes a pair of end pieces having loops interconnected in mutually transverse positions and a center piece surrounding the loops so interconnected which includes,
the step of forming end pieces in separate parts and fitting them together by inserting the parts of the loop into interconnected relation with the loop of the other center piece and welding the parts of the center pieces together.

7. An angular coupling comprising,
only three main parts,
a pair of identical end pieces which are effectively integral, and
a center piece,
the end pieces being interconnected and each having a unitary and effectively unitary element forming a pin about which the other swings to angular positions between the end pieces, and
the center piece surrounding the interconnected portions of the end pieces and forming the sole means for transmitting torque between the end pieces.

8. An angular coupling according to claim 1, wherein the end pieces each include a connecting section of substantial mass and the end pieces are made up of parts respectively on opposite sides of a parting plane passing through the connecting sections and loops, and the separate parts of each end piece are welded together.

9. An angular coupling according to claim 1, wherein the elements of the loops are rectangular in cross section,
the loops constitute the sole means connecting the end pieces together, and
the linear elements of the center piece are rectangular in cross-section.

10. An angular coupling according to claim 2, wherein the center piece includes a pair of bend elements at each end spaced apart and those at each end being disposed at transverse positions relative to those at the other end, and a tubular element between the bend elements at each end, each loop surrounding an adjacent one of the tubular elements and passing through the tubular element at the other end, the tubular elements forming bearings for the loops.

11. An angular coupling according to claim 1, wherein the tubular elements overlap longitudinally of the center piece.

* * * * *